United States Patent
Leonard et al.

(10) Patent No.: US 7,934,028 B1
(45) Date of Patent: Apr. 26, 2011

(54) MANAGING QUEUE CAPACITY IN A MESSAGING QUEUE IN A COMPUTING ENVIRONMENT

(75) Inventors: Mark Leonard, Olathe, KS (US); Terriss Ford, Overland Park, KS (US)

(73) Assignee: Sprint Communications Company L.P., Overland PArk, KS (US)

( * ) Notice: Subject to any disclaimer, the term of this patent is extended or adjusted under 35 U.S.C. 154(b) by 437 days.

(21) Appl. No.: 12/030,445

(22) Filed: Feb. 13, 2008

(51) Int. Cl.
*G06F 13/00* (2006.01)
*G06F 3/00* (2006.01)
(52) U.S. Cl. ............... 710/56; 710/15; 710/36; 710/52
(58) Field of Classification Search ................. None
See application file for complete search history.

(56) References Cited

U.S. PATENT DOCUMENTS

| | | | | |
|---|---|---|---|---|
| 2001/0055313 | A1* | 12/2001 | Yin et al. | 370/466 |
| 2008/0267203 | A1* | 10/2008 | Curcio et al. | 370/412 |
| 2009/0180380 | A1* | 7/2009 | Prabhakar et al. | 370/232 |

OTHER PUBLICATIONS

Triantos, Nick, Queue Depth, Apr. 30, 2006, storagefoo.blogspot.com [online, accessed on Dec. 17, 2010], URL: http://storagefoo.blogspot.com/2006/04/queue-depths.html.*

* cited by examiner

Primary Examiner — Tariq Hafiz
Assistant Examiner — Scott Sun (57) ABSTRACT

A method and system for automatically managing alarms in an environment where a period of time could pass before the cause of the alarm is addressed is explained herein. The method includes automatically increasing the maximum depth of a queue (i.e. the maximum capacity of a queue to store data) in response to an indication that the current depth of the queue exceeds a high-level alarm setting. Upon determining that the depth of the queue has fallen below the original high-level alarm setting, the maximum depth of the queue is automatically returned to the original maximum setting. In addition, a low-level alarm may be disabled in conjunction with increasing the maximum depth and reactivated upon returning the maximum queue depth to the original setting.

17 Claims, 5 Drawing Sheets

MANAGING QUEUE CAPACITY IN A MESSAGING QUEUE IN A COMPUTING ENVIRONMENT

CROSS-REFERENCE TO RELATED APPLICATIONS

Not applicable.

SUMMARY

The present invention is defined by the claims below. Embodiments of the present invention provide for automatically responding to an incident message. Embodiments of the present invention have several practical applications in the technical arts including optimizing queue settings and providing additional time for a designated responder to correct queue problems without disrupting functions of applications interacting with the queue. Specifically, one embodiment automatically changes the depth of a queue upon receiving an alarm indicating the queue depth has crossed a preset threshold.

In a first illustrative embodiment, one or more computer-readable media having computer-executable instructions embodied thereon for performing a method of automatically managing alarms in an environment where a period of time could pass before the cause of the alarm is addressed is described. The method includes receiving information indicating that a depth level of a queue exceeds an original high-depth-alarm setting, wherein the depth level is a measure of data within the queue. The method also includes increasing the maximum depth of the queue from an original maximum setting to an updated maximum setting that is larger than the original maximum setting. Increasing the queue depth allows the queue to receive additional messages while a cause of a high-depth condition receives user attention and prevents disruption to a process of transferring messages to the queue. The method further includes storing an indication that the maximum depth of the queue was increased, such that the maximum depth may be reset upon determining that the cause of the high-depth condition is resolved.

In another illustrative embodiment, one or more computer-readable media having computer-executable instructions embodied thereon for performing a method of automatically optimizing a maximum depth in a queue after an upset condition influencing the queue depth is resolved is described. The method includes receiving an indication that the maximum depth for the queue has been changed from an original maximum setting to an updated maximum setting that is higher than the original maximum setting and that the maximum depth has not been reset. The maximum depth was increased in response to a queue depth exceeding an original high-depth-alarm setting. The method further includes determining that a current depth in the queue is presently less than the original high-depth-alarm setting, thereby indicating that a cause of the upset condition is resolved and decreasing the maximum depth to the original maximum setting, wherein the original maximum setting is determined at a time a high-depth-alarm is generated. Decreasing the maximum setting optimizes computer memory allocated to the queue.

In a third illustrative embodiment, one or more computer-readable media having computer-executable instructions embodied thereon for performing a method of automatically modifying attribute settings for a messaging middleware queue in response to a high-depth event generated by a messaging middleware application is described. The method includes receiving a correction instruction based on an event indicating that a depth level in a queue exceeds an original high-depth-alarm setting, wherein the depth level is a measure of data within the queue. Upon receiving the correction message, the maximum depth for the queue is increased from an original maximum setting to an updated maximum setting that is larger than the original maximum setting. Increasing the maximum setting allows the queue to receive additional messages while a cause of a high-depth condition receives user attention and prevents disruption to a process of transferring messages to the queue. In addition to increasing the maximum setting, a low-depth event for the queue is also disabled upon receiving the correction message. The method also includes storing an indication that the maximum depth for the queue was changed and not reset. At some time after the maximum setting was increased, the method includes determining whether a current depth level is less than the original high-depth-alarm setting. If the current depth level is less than the original high-depth-alarm setting then the maximum depth is changed to the original maximum setting, an indication that the maximum depth was reset is generated, and the low-depth event for the queue is activated. If the current depth level is not less than the original high-depth-alarm setting, then after a predetermined amount of time it is determined whether a current depth level is less than the original high-depth-alarm setting.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The present invention will be better understood from the detailed description provided below and from the accompanying drawings of various embodiments of the invention, which describe, for example, updating attribute settings for a queue in response to a high-depth incident in the queue. The detailed description and drawings, however, should not be read to limit the invention to the specific embodiments. Rather, these specifics are provided for explanatory purposes that help the invention to be better understood.

As one skilled in the art will appreciate, embodiments of the present invention may be embodied as, among other things: a method, system, or computer-program product.

Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Exemplary Operating Environment

As stated above, the present invention may be embodied as, among other things: a method, system, or computer-program product that is implemented as software, hardware or a combination of the two, or as computer-readable media having computer-usable instructions embodied thereon. In these embodiments, the exemplary operating environment may be as simple as a single computing device. Examples of computing devices that may be suitable for use with the invention include, but are not limited to, personal computers, server computers, handheld or laptop devices, multiprocessor systems, microprocessor-based systems, set top boxes, programmable consumer electronics, network personal computers (PCs), minicomputers, and mainframe computers.

Figure 1:
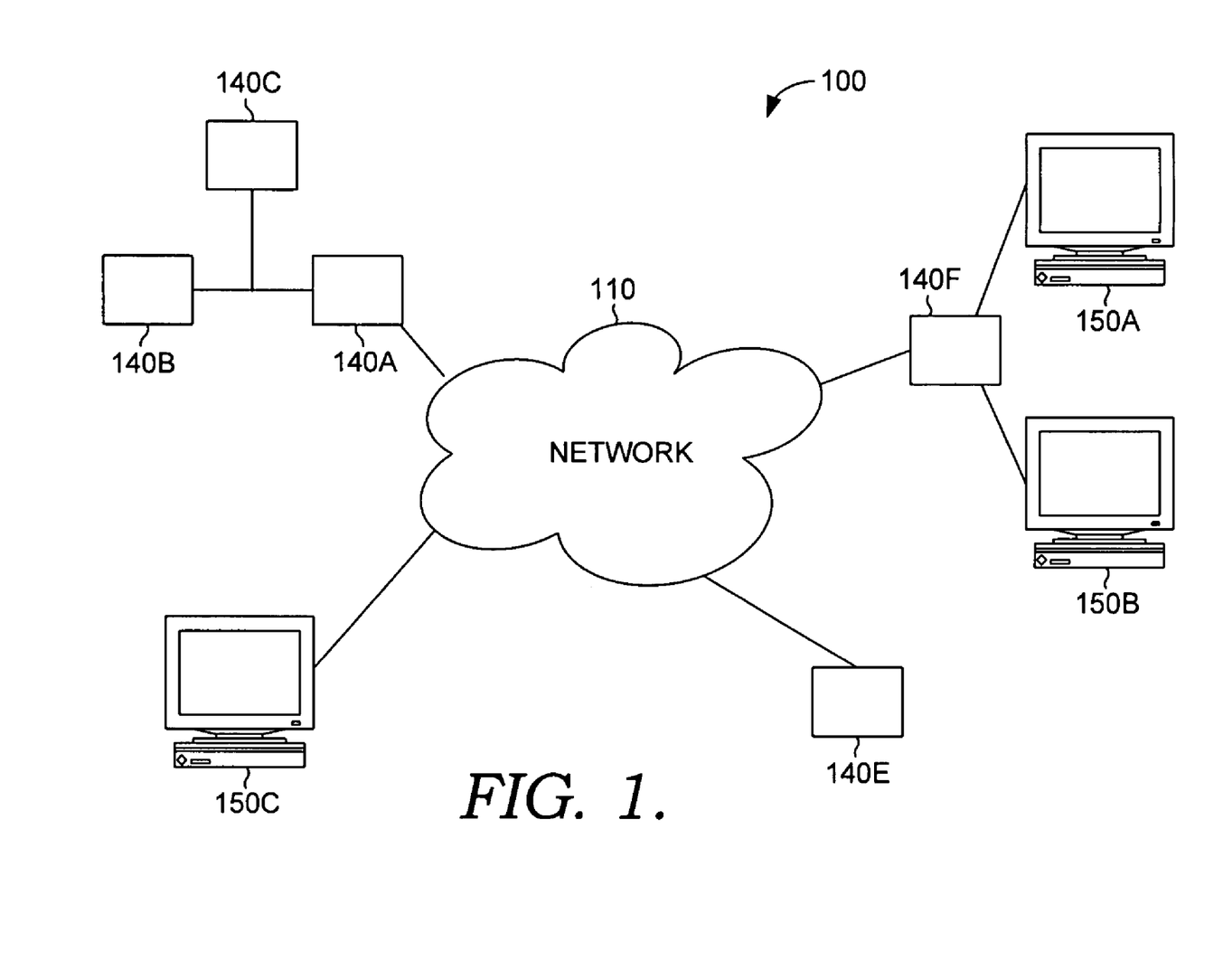
FIG. 1 is a drawing of an illustrative environment in which an embodiment of the present invention may operate.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C which communicate with each other via LAN 114, servers 140E and 140F all of which communicate with each other via network 110. Operating environment 100 is merely an example of one suitable networking environment and is not intended to suggest any limitation as to the scope of use or functionality of the present invention. Neither should operating environment 100 be interpreted as having any dependency or requirement related to any single component or combination of components illustrated therein.

The client computing devices 150A, 150B, and 150C are configured for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smartphone, PDA, or the like. It should be noted that embodiments are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement the present invention.

It will be understood by those of ordinary skill in the art that operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of embodiments in any form.

Figure 2:
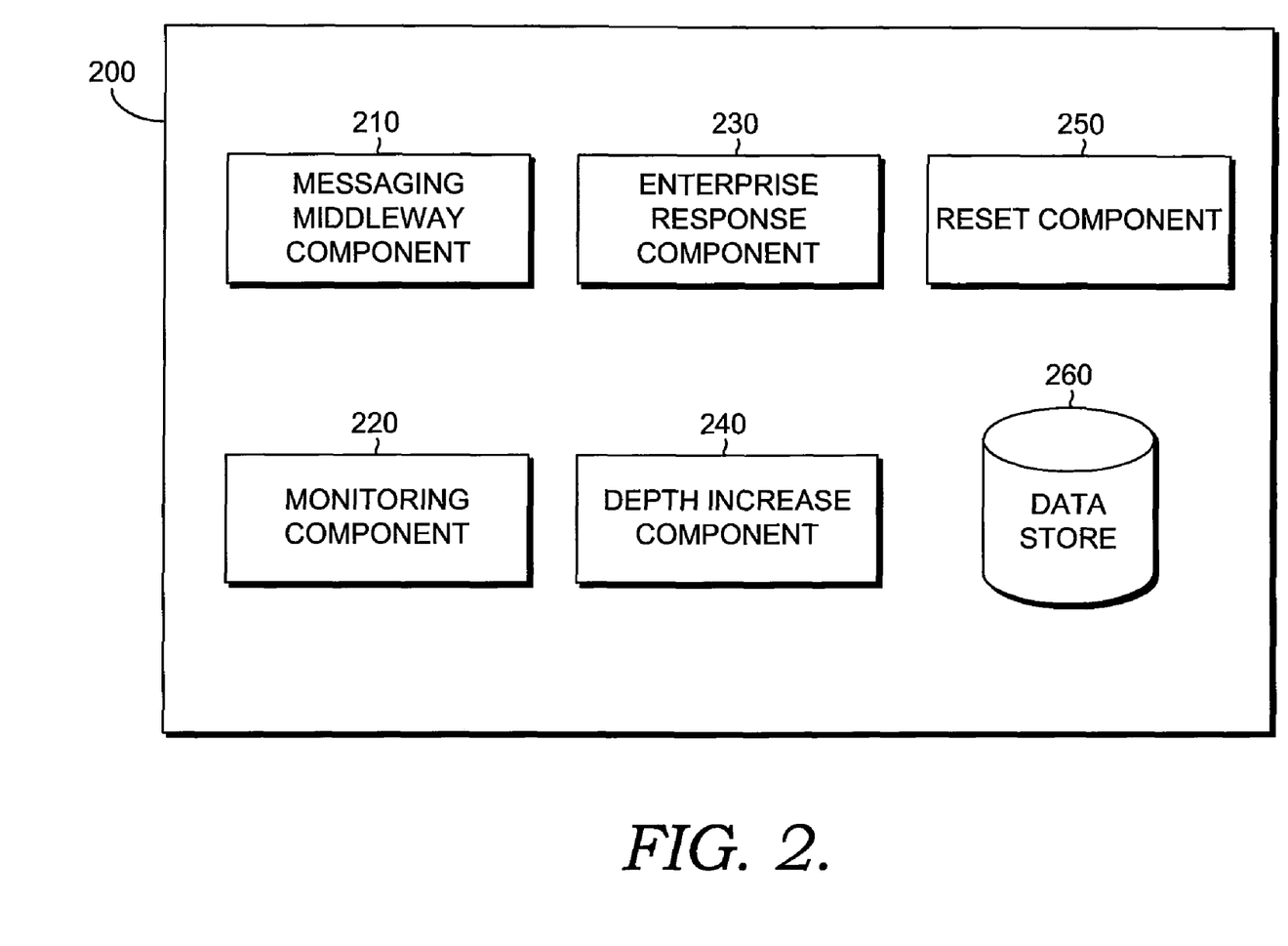
FIG. 2 is a drawing of an operating environment in which an embodiment of the present invention may be practiced.

Turning now to FIG. 2, a block diagram depicts an exemplary computing system architecture 200 suitable for automatically modifying a queue depth in response to a queue-depth alarm, in accordance with an embodiment of the present invention. It will be understood and appreciated by those of ordinary skill in the art that the computing system architecture 200 shown in FIG. 2 is merely an example and is not intended to suggest any limitation as to the scope of the use or functionality of the present invention. Neither should the computing system architecture 200 be interpreted as having any dependency or requirement related to any single component or combination of components illustrated therein.

Exemplary computing system architecture 200 includes a messaging middleware component 210, a monitoring component 220, an enterprise response component 230, a depth-increase component 240, a reset component 250, and data store 260. Exemplary computing-system architecture 200 may reside in a single computing device. In the alternative, exemplary computing system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging middleware applications (a.k.a message-oriented middleware) include IBM's WebSphere® MQ (formerly MQ Series®), Fiorano's MQ, Oracle Advanced Queuing (AQ), and Microsoft's MSMQ. The messaging-middleware component 210 can be any application that uses queues to transfer messages from one application to another. For example, information from application A is formed into one or more messages. These messages from application A will be placed in a sending queue, within the messaging-middleware component 210, and transferred by the messaging-middleware component 210 into a receiving queue within the messaging-middleware component 210. Program B will then retrieve the message from the receiving queue. The message is transmitted through channels within the messaging-middleware component. In this example, programs A and B could be located on any computing device communicatively coupled to the one or more computers on which the messaging-middleware component 210 resides.

The sending and receiving queues within the messaging-middleware component 210 are described by a series of attributes. Each attribute has an associated value or setting. For example, one attribute could be a queue name and the associated setting could be "SprintBillinginfo1." Some attributes are preset, while other attributes measure current conditions within the queue and change over time. For example, the queue name attribute is pre-set, but the current queue depth attribute changes based on the number of messages in the queue. Throughout this disclosure preset attributes will be associated with settings, and attributes that are based on queue conditions are associated with attribute values. The primary attribute settings and values that are involved in embodiments of the present invention include a maximum depth setting, a high-depth-alarm setting, a low-depth-alarm setting, a low-depth-alarm activation setting, and a current depth value. Many other attributes may be used to describe a queue and may be accessed or modified in embodiments of the present invention.

The above mentioned attributes are related to queue depth in a queue, which is the amount of information in the queue. The amount of information may be measured in a variety of units of measure including the number of messages or bytes of data. The maximum allowable depth setting is the maximum amount of information the queue can hold before incoming messages are turned away. In other words, the queue depth is equivalent to the amount of information the queue can hold. The queue depth may be increased or decreased by allocating more of less computer memory to the queue. The maximum depth setting is preset. The current depth value is the current amount of information in the queue.

The high-depth-alarm setting is the depth at which an alarm will be generated when the current depth moves from less than the high-depth-alarm setting to above the high-depth-alarm setting. In general, the high-depth-alarm setting is set at a depth level approaching the maximum depth and above normal operating conditions. The purpose of the alarm is to alert a designated responder (i.e., a person or program designed to respond to queue problems) to a potential problem with the queue in time to take corrective action before the queue reaches maximum depth and messages are turned away. The low-depth-alarm setting is the depth at which a low-depth alarm will be triggered when the current depth changes from a value greater than the low-depth-alarm setting to a value that is less than the low-depth-alarm setting. In some embodiments, the triggering of the low-depth alarm is treated as an all clear by designated responders causing them to take no further action in response to the related high-depth-alarm.

Both the low-depth-alarm setting and the high-depth-alarm setting may be based on percentages of the maximum allowable depth. For example, the high-depth-alarm setting could be 80% of the maximum allowable depth and the low-depth-alarm setting could be 20% of the maximum allowable depth.

In one embodiment, the high-depth-alarm setting and low-depth-alarm setting are automatically updated when the maximum allowable depth is updated. For example, when the maximum depth is changed from 100 messages to 200 messages the high-level-alarm setting may automatically be updated from 80 messages to 160 messages. The low-depth-alarm activation setting turns the low-depth alarm on or off. When the low-depth-alarm activation setting is set to "off," a low-depth alarm will not be generated even though the current depth changes from a value greater than the low-depth-alarm setting to a value that is less than the low-depth-alarm setting.

Monitoring component 220 is configured to monitor messaging-middleware objects (e.g., channels and queues) for upset conditions that may require corrective actions. Examples of commercially available monitoring components include HP Openview®, Q Pasa!® by MQSoftware, Candle's PathWAI, and BMC Patrol. The upset conditions may be detected in at least one of two different ways. In one embodiment, the monitoring component 220 monitors events generated by the messaging-middleware component 210. The messaging-middleware component 210 generates events based on attribute settings associated with a queue. For example, a high-depth-alarm event will be generated when the current depth of the queue exceeds the high-depth-alarm setting and the high-depth-alarm activation setting is set at "on." In this instance, the monitoring component 220 would retrieve, or receive the event notification from the messaging-middleware component 210. In this embodiment, the messaging-middleware component 210 is keeping track of the queue depth and the monitoring component 220 is not actively monitoring the queue depth. In a second embodiment, the monitoring component 220 polls the queue periodically to ascertain current attribute values associated with the queue. For example, the current depth of the queue could be retrieved periodically. Having retrieved an attribute value, the attribute value is evaluated against threshold values within the monitoring component 220, such as a high-depth threshold value for a particular queue. The monitoring component 220 would then generate an alarm if the current queue depth exceeds the threshold high-depth value. This embodiment may not utilize events generated by the messaging-middleware component.

The monitoring component 220 is also configured to generate and transmit notifications describing upset conditions within a queue. As previously stated, the monitoring component 220 may learn of the upset condition through an event generated by the messaging-middleware component 210 or by obtaining queue attribute values directly from the queue. In one embodiment, the information about the upset condition is transmitted to enterprise response component 230. In another embodiment, the monitoring component 220 directly notifies a designated responder about the upset condition. The monitoring component 220 is further configured to receive instructions from other components regarding actions to be taken relative to a queue within a messaging-middleware component 210, or in relation to other components communicatively connected to the monitoring component 220. In one embodiment, the monitoring component is configured to change one or more attribute settings in a queue.

Enterprise response component 230 is configured to coordinate a response to an upset condition detected in a queue within the messaging-middleware component 210. The enterprise response component 230 may receive information regarding upset conditions from a monitoring component 220 or another source. Upon receiving notification of an upset condition, the enterprise response component 230 may page a designated responder to investigate the upset condition. In one embodiment, the enterprise response component 230 is configured to take corrective action in response to learning of the upset condition, or direct another component to take corrective action in response to the upset condition.

Depth-increase component 240 is configured to increase the maximum depth of a queue from an original maximum setting to an updated maximum setting. Increasing the maximum depth of the queue may not correct the underlying cause of the high depth in the queue, but it will provide more time for a designated responder to find and fix the underlying cause of the high depth. If the queue depth reaches the maximum depth then subsequently transmitted messages will be turned away from the queue, and data could be lost. The depth-increase component 240 may also be configured to deactivate a low-depth alarm and record attribute values and settings for the queue. The low-depth alarm may be associated with an event triggered by messaging-middleware component 210 or a threshold value within monitoring component 220. In addition, the depth-increase component 240 may store an indication that the queue depth has been increased and not reset. This indication may be accessed by reset component 250 to monitor the queue for the opportunity to reset the depth to the original maximum setting.

Reset component 250 is configured to decrease the maximum depth setting of a queue after the maximum allowable depth setting was increased in response to an upset condition. In one embodiment, the reset component 250 determines that a maximum allowable depth has not been reset by evaluating an indication contained in a data store such as data store 260. As stated previously, this indication may be generated by the component that increased the maximum depth in the queue, for example depth-increase component 240. In one embodiment, reset component 250 will decrease the maximum allowable depth to the original depth setting upon determining that the current depth is less than the original high-depth-alarm setting. The reset component 250 may also activate a low-depth alarm if the low-depth alarm has been deactivated. Activating the low-depth alarm may be accomplished by changing the setting associated with the low-depth-alarm activation attribute. In one embodiment, upon activating the low-depth alarm, attribute values and settings for the queue are recorded in a data store, such as data store 260.

The data store 260 is configured for storing information related to a queue. Information such as an original high setting, an updated high setting, a reset indication, and other queue attributes including queue identification information may be stored.

Expounding on Various Aspects

Figure 3:
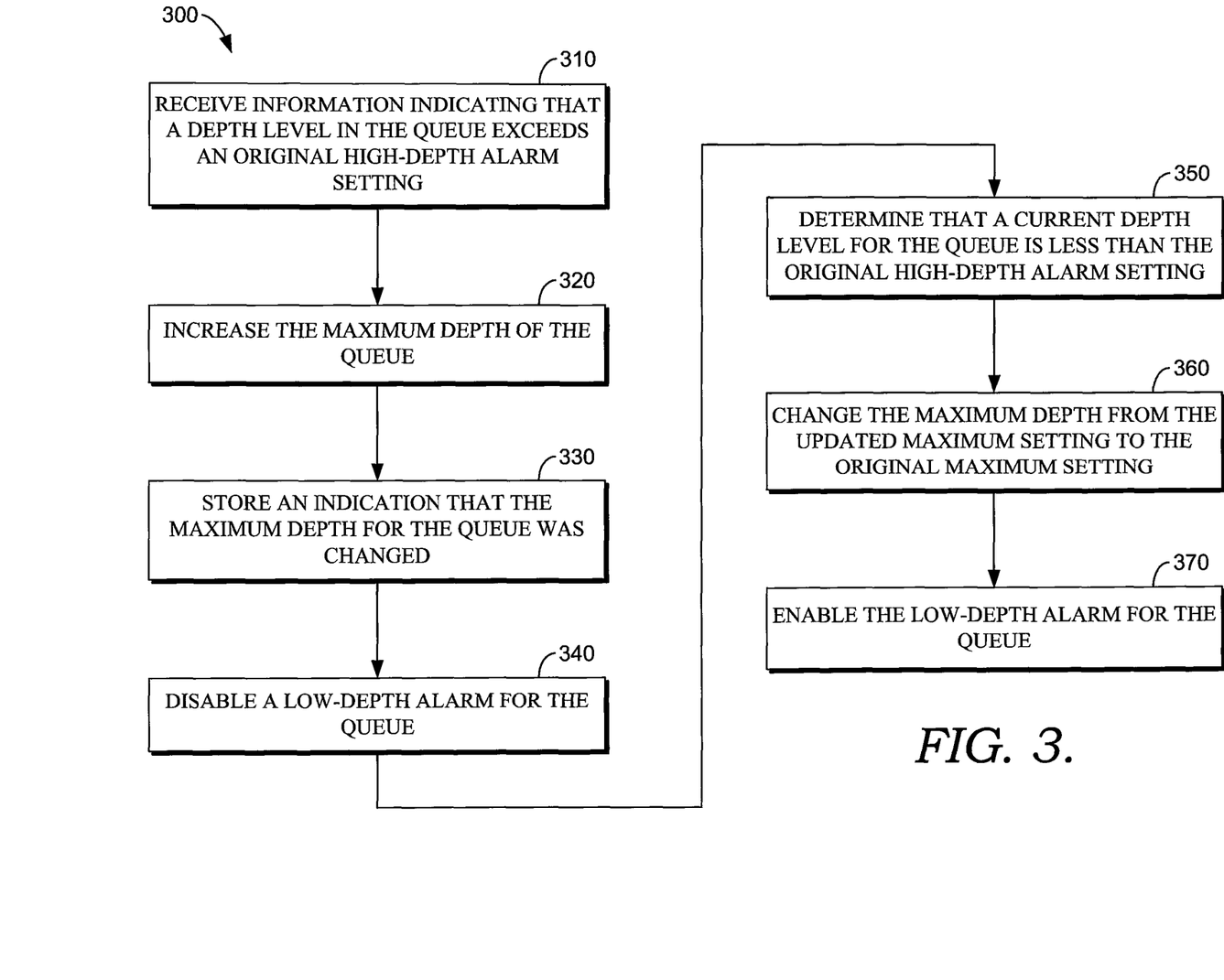
FIG. 3 is a flow diagram in which a method of automatically managing alarms in an environment where a period of time could pass before the cause of the alarm is addressed is described according to an embodiment of the present invention.

Turning now to FIG. 3, a method of automatically managing alarms is disclosed. In one embodiment, automatically means without human intervention. At step 310, information indicating that a depth level of a queue exceeds an original high-depth setting is received. In one embodiment, the information originates from an event generated by a messaging-middleware component 210. In this embodiment, the original high-depth-alarm setting would be one of the queue attributes. As stated previously, the event may be received by a monitoring component 220. In another embodiment, a monitoring component 220 polls the queue to determine the depth level and compares it with threshold values within the monitoring component 220. In this embodiment, the high-depth setting is a threshold value within the monitoring component 220.

At step 320, a maximum depth of the queue is increased from an original maximum setting to an updated maximum setting that is larger than the original maximum setting. As stated previously, the queue depth may be measured in terms of number of messages or bytes of data. A number of different methodologies could be used to determine the amount of increase. For example, the updated maximum setting could be a percentage increase over the original maximum setting. In another embodiment, the original maximum setting may be increased by a fixed amount of data measured in either messages or bytes. For example, the maximum allowable depth could be increased by 100 messages, or 1 MB of data. As stated previously, increasing the depth of the queue allows the queue to continue receiving messages while the cause of the high-depth condition is identified and corrected. This prevents disruption to the transmission of messages to the queue and decreases the possibility that messages could be lost if the queue becomes full.

At step 330, an indication that the maximum depth of the queue was increased is stored. In one embodiment, this indication is stored by generating an entry in a data store. The entry includes at least queue identification information, the original maximum value, the original high-depth setting, and a reset-request indication field. The reset-request indication field includes a first indication that indicates the maximum depth was increased and not reset.

At step 340, a low-depth alarm for the queue is disabled in conjunction with increasing the maximum depth. The low-depth alarm may be a queue attribute or part of a monitoring solution, such as monitoring component 220. As described previously, a low-depth alarm may generate an alarm when the depth level of the queue crosses from above a low-depth-alarm setting to below the low-depth-alarm setting. If the low-depth alarm is automatically recalculated as a percentage of the maximum depth when the maximum depth is increased, a designated responder may interpret the low-depth alarm as an all clear and stop investigating a potential problem with the queue. Disabling the low-depth alarm ensures that a designated responder will continue to investigate the cause of the high-depth-alarm.

At step 350, a current depth level for the queue is determined to be less than the original high-depth setting. This may be accomplished by polling the queue depth. A purpose of step 350 is to determine if the cause of the high-depth-alarm has been resolved. The cause, if any, of the high-depth-alarm is presumed to be resolved if the queue depth is less than the original high-depth setting. In other words, the queue depth is within the original normal operating parameters.

Incident to determining that a current depth level for the queue is less than the original high-depth-alarm setting, at step 360 the maximum depth is changed from the updated maximum setting back to the original maximum setting. This may be accomplished by adjusting the maximum depth attribute setting associated with the queue. At step 370, the low-depth alarm for the queue is enabled. As stated previously, the low-depth alarm may be a queue attribute or part of a monitoring solution, such as monitoring component 220. If the low-depth alarm is a queue attribute then it may be activated by changing the low-depth-alarm activation setting to "on." In one embodiment, upon resetting the maximum depth an indication is made in a reset-request field within the data store indicating that the maximum depth for the queue was reset. This communicates to a component, such as the reset component 250, that no further action need be taken with that particular queue.

Figure 4:
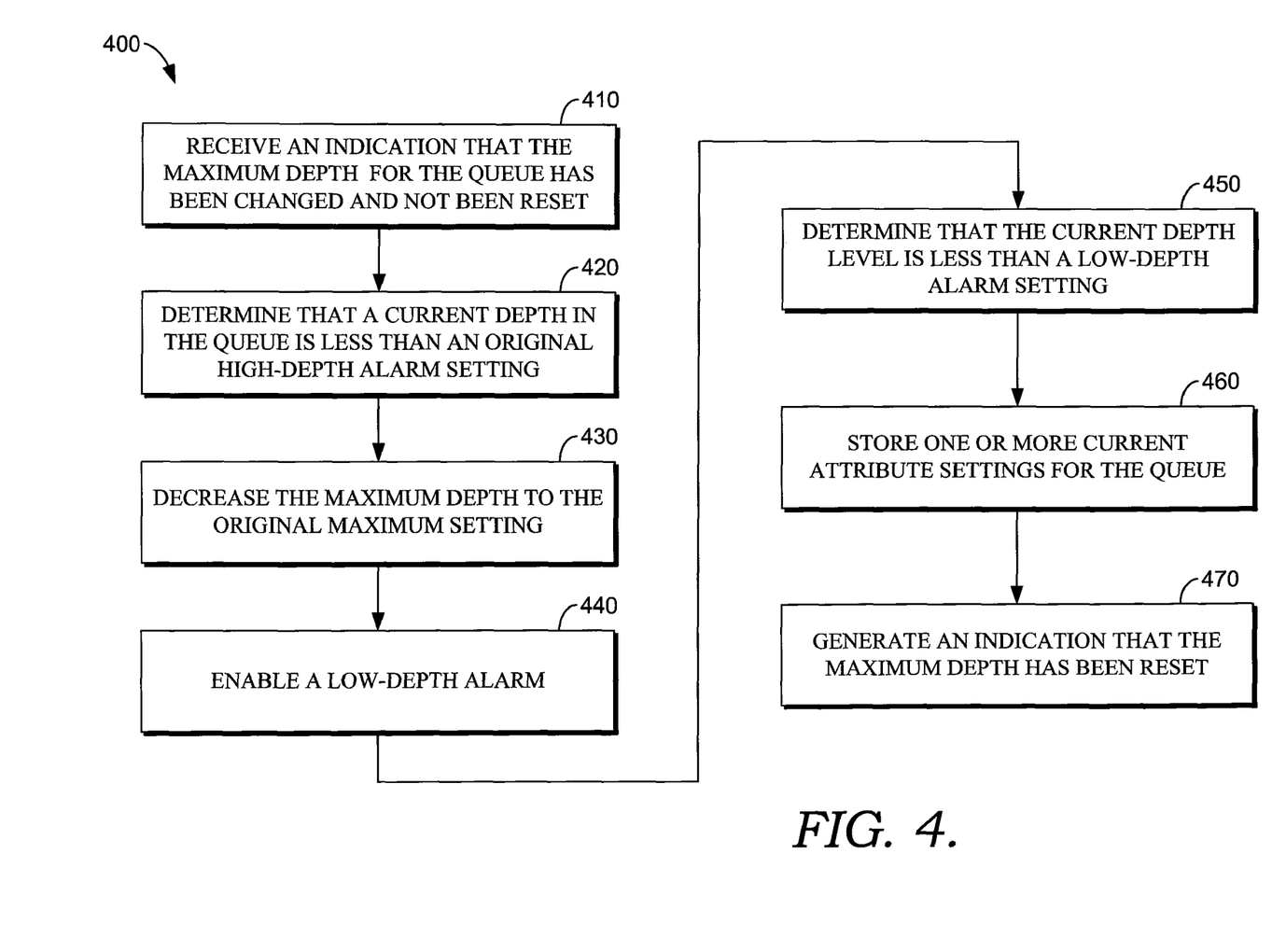
FIG. 4 is a flow diagram in which a method of automatically optimizing a maximum depth in a queue after an upset condition influencing the queue depth is resolved is shown according to an embodiment of the present invention.

Turning now to FIG. 4, a method of automatically optimizing a maximum depth in a queue after an upset condition influencing the queue depth is resolved is described. As described previously, the maximum depth may have been changed from an original maximum setting to an updated maximum setting in response to the depth of the queue exceeding the high-depth-alarm setting. At step 410, an indication that the maximum depth for the queue has been changed from an original maximum setting to an updated maximum setting is received along with an indication that the maximum allowable depth has not since been reset. In one embodiment, the indication is received in response to a search of a data store containing information about the queues and queue modifications. At step 420, a current depth in the queue is determined to be less than an original high-depth-alarm setting. In one embodiment, the original high-depth-alarm setting is stored along with other queue information in a data store 260. The current depth of the queue may be obtained by polling the queue for present attribute values. At step 430, after it is determined that the queue depth is less than the original high-depth-alarm setting, the maximum depth is decreased from the updated maximum setting to the original maximum setting. In one embodiment, the original maximum setting is stored in a data store in conjunction with other information about the queue.

At step 440, a low-depth alarm is enabled. In one embodiment, the low-depth alarm was disabled when the maximum depth was increased from the original maximum setting to the updated maximum setting. At step 450, it is determined that the current depth level is less than a low-depth-alarm setting. In conjunction with this determination, one or more current attribute values for the queue are stored in a data store at step 460. Storing the attribute values allows designated responders to review the high-depth incident and evaluate potential changes to attribute setting that may help avoid future incidents. At step 470, an indication may be generated that indicates the maximum depth has been reset. This indication allows the designated responders and applications performing the steps described above that the queue has been restored to the settings existing at the time the high-depth incident occurred.

Figure 5:
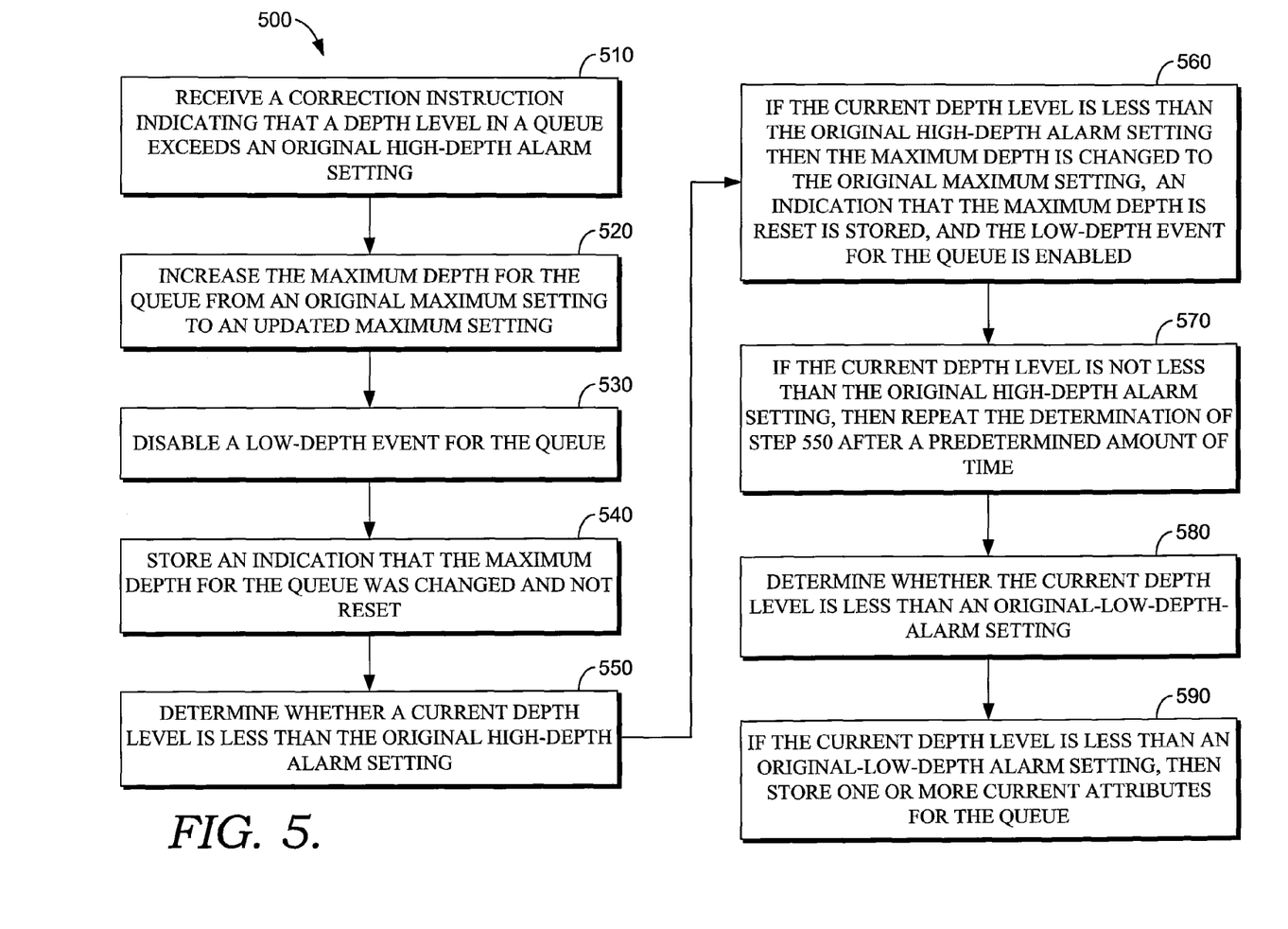
FIG. 5 is a flow diagram in which a second method of automatically modifying attribute settings for a messaging-middleware queue in response to a high-depth event generated by a messaging-middleware application according to an embodiment of the present invention.

Turning now to FIG. 5, a method of automatically modifying attribute settings for a messaging-middleware queue in response to a high-depth event generated by a messaging-middleware application is described. A high-depth event occurs when the depth of the queue crosses from below a high-depth-alarm setting to above the high-depth-alarm setting. As described previously, a high-depth event indicates that a problem exists that is causing the queue volume to exceed normal operating depths. If the queue is allowed to become full, messages transmitted to the queue will not be accepted, and data could be lost. In general, the high-depth-alarm setting is set above normal operating conditions but less than the full depth so that corrective action may be taken by a designated responder before data is lost.

At step 510, a correction instruction based on an event indicating that a depth level in the queue exceeds an original high-depth-alarm setting is received. In one embodiment, the correction instruction is received from an enterprise response component 230 that has received information from the event generated by the messaging-middleware component 210. This is just one example, and the correction instruction could be generated by any component communicatively coupled to the messaging-middleware component 210. In one embodiment, the correction instruction is generated by the messaging-middleware component 210.

At step 520, a maximum depth for the queue is increased from an original maximum setting to an updated maximum setting that is larger than the original maximum setting. In one embodiment, the updated maximum setting is a percentage larger than the original maximum setting. In another embodiment, the updated maximum setting is a fixed data volume larger than the original maximum setting. Increasing the maximum depth allows the queue to continue receiving messages while the cause of the high depth event is investigated. This allows the transmission of messages to continue without disruption.

At step 530, a low-depth level event for the queue is disabled. As described previously, this may be accomplished by changing the setting associated with the low-depth-event activation setting associated with the queue. At step 540, an indication that the maximum depth for the queue was changed and not reset is stored. As described previously, this indication may be stored in a data store 260. Subsequent to increasing the queue depth, at step 550, it is determined whether a current depth level is less than the original high-depth-alarm setting. Step 550 may occur any time after step 540. The purpose of the time delay is to allow the cause of the high-depth event to be resolved. Once the cause of the high-depth event is resolved it is desirable to return the maximum depth of the queue to the original setting, which is theoretically optimized based on the queue's normal operating conditions. Leaving the maximum depth of the queue at an unnecessarily deep setting may waste computer storage.

If the current depth level is less than the original high-depth-alarm setting then at step 560, the maximum depth is changed back to the original maximum setting, an indication that the maximum depth has been reset is stored, and the low-depth event is enabled. At step 570, if the current depth level is not less than the original high-depth setting then the determining step 550 is repeated after a predetermined amount of time. At step 580, it is determined whether the current depth level is less than an original low-depth-alarm setting. At step 590, if the current depth level is less than the original low-depth-alarm setting then the one or more current attributes for the queue are restored. In general, step 590 will occur only after step 560.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media having computer-executable instructions embodied thereon for performing a method of automatically managing alarms in an environment where a period of time could pass before the cause of the alarm is addressed, the method comprising;

receiving information indicating that a depth level of a queue exceeds an original high-depth-alarm setting, wherein the depth level is a measure of data within the queue, wherein the original high-depth-alarm setting is a first percentage of a maximum depth;

increasing the maximum depth of the queue from an original maximum setting to an updated maximum setting that is larger than the original maximum setting, thereby (1) allowing the queue to receive additional messages while a cause of a high-depth condition receives user attention, and (2) preventing disruption to a process of transferring messages to the queue;

disabling a low-depth alarm for the queue that generates an alarm when the depth level crosses from above a low-depth-alarm setting to below the low-depth-alarm setting, wherein the low-depth-alarm setting is a second percentage of the maximum depth; and storing an indication that the maximum depth of the queue was increased, such that the maximum depth may be reset upon determining that the cause of the high-depth condition is resolved.

2. The media of claim 1, further comprising:

determining that a current depth level for the queue is less than the original high-depth-alarm setting;

incident to said determining, (1) changing the maximum depth from the updated maximum setting to the original maximum setting and (2) enabling the low-depth alarm for the queue.

3. The media of claim 1, wherein said storing comprises:

generating an entry in a data store that includes at least queue identification information, the original maximum setting, the original high-depth-alarm setting, and a reset-request indication field that includes a first indication that indicates the maximum depth was increased and not reset.

4. The media of claim 3, further comprising:

determining that a current depth level for the queue is less than the original high-depth-alarm setting;

incident to said determining, changing the maximum depth from the updated maximum setting to the original maximum setting.

5. The media of claim 4, further comprising:

incident to said changing, modifying the reset-request indication field to a second indication that indicates the maximum depth was reset.

6. The media of claim 1, wherein the queue is a messaging-middleware queue.

7. The media of claim 1, wherein the information originates from one or more of an event generated by a queue manager and a queue monitoring component that generates alarm messages.

8. One or more computer-readable media having computer-executable instructions embodied thereon for performing a method of automatically managing alarms in an environment where a period of time could pass before the cause of the alarm is addressed, the method comprising;

receiving information indicating that a depth level of a queue exceeds an original high-depth-alarm setting, wherein the depth level is a measure of data within the queue, wherein the queue is a messaging-middleware queue, and wherein the information originates from an event message, wherein the high-depth-alarm setting is a first percentage of a maximum depth;

increasing the maximum depth of the queue from an original maximum setting to an updated maximum setting that is larger than the original maximum setting, thereby (1) allowing the queue to receive additional messages while a cause of a high-depth condition receives user attention, and (2) preventing disruption to a process of transferring messages to the queue;

disabling a low-depth alarm for the queue that generates an alarm when the depth level crosses from above a low-depth-alarm setting to below the low-depth-alarm setting, wherein the low-depth alarm for the queue, wherein the low-depth-alarm setting is a second percentage of the maximum depth; and storing an indication that the maximum depth of the queue was increased, such that the maximum depth may be reset upon determining that the cause of the high-depth condition is resolved.

9. The media of claim 8, wherein the method further comprises determining that a current depth level for the queue is less than the original high-depth-alarm setting; and incident to said determining, (1) changing the maximum depth from the updated maximum setting to the original maximum setting, and (2) enabling the low-depth alarm for the queue.

10. The media of claim 8, wherein said storing comprises:

generating an entry in a data store that includes at least queue identification information, the original maximum setting, and a reset-request indication field that includes a first indication that indicates the maximum depth was increased and not reset.

11. The media of claim 8, wherein the event message is generated by a queue manager.

12. The media of claim 8, wherein the event message is generated by a queue monitoring component that generates alarm messages.

13. One or more computer-readable media having computer-executable instructions embodied thereon for performing a method of automatically managing alarms in an environment where a period of time could pass before the cause of the alarm is addressed, the method comprising;

receiving information indicating that a depth level of a queue exceeds an original high-depth-alarm setting, wherein the depth level is a measure of data within the queue, wherein the queue is a messaging-middleware queue, and wherein the high-depth-alarm setting is a first percentage of a maximum depth;

increasing the maximum depth of the queue from an original maximum setting to an updated maximum setting that is larger than the original maximum setting, thereby (1) allowing the queue to receive additional messages while a cause of a high-depth condition receives user attention, and (2) preventing disruption to a process of transferring messages to the queue;

disabling a low-depth alarm for the queue that generates an alarm when the depth level crosses from above a low-depth-alarm setting to below the low-depth-alarm setting, wherein the low-depth alarm for the queue, wherein the low-depth-alarm setting is a second percentage of the maximum depth; and storing an indication that the maximum depth of the queue was increased, such that the maximum depth may be reset upon determining that the cause of the high-depth condition is resolved, wherein the indication is an entry in a data store that includes at least queue identification information, the original maximum setting, and a reset-request indication field that includes a first indication that indicates the maximum depth was increased and not reset.

14. The media of claim 13, wherein the method further comprises determining that a current depth level for the queue is less than the original high-depth-alarm setting; and incident to said determining, (1) changing the maximum depth from the updated maximum setting to the original maximum setting, (2) enabling the low-depth alarm for the queue, and (3) updating the reset-request indication field to include a second indication that indicates the maximum depth was reset to the original maximum depth setting.

15. The media of claim 13, wherein the information originates from an event message.

16. The media of claim 15, wherein the event message is generated by a queue manager.

17. The media of claim 16, wherein the event message is generated by a queue monitoring component that generates alarm messages.

* * * * *